United States Patent [19]

Schmidt

[11] 4,201,919
[45] May 6, 1980

[54] X-RAY FILM LOADER

[75] Inventor: Gunter Schmidt, Malibu, Calif.

[73] Assignee: E. I. Du Pont de Nemours and Company, Wilmington, Del.

[21] Appl. No.: 5,720

[22] Filed: Jan. 23, 1979

Related U.S. Application Data

[63] Continuation-in-part of Ser. No. 805,817, Jun. 13, 1977, abandoned.

[51] Int. Cl.² ............................................. G03B 41/16
[52] U.S. Cl. ...................................... 250/468; 271/18; 414/412
[58] Field of Search .................. 250/468, 475, 481; 271/18 R; 214/305

[56] References Cited

U.S. PATENT DOCUMENTS

| | | | |
|---|---|---|---|
| 3,075,080 | 1/1963 | Sano | 250/468 |
| 3,790,160 | 2/1974 | Schmidt | 271/18 R |
| 3,912,932 | 10/1975 | Matsumoto et al. | 250/468 |
| 3,934,735 | 1/1976 | Schmidt | 250/468 |
| 3,959,654 | 5/1975 | Stievenart et al. | 250/468 |

FOREIGN PATENT DOCUMENTS 1263585  5/1961  France .

*Primary Examiner*—Alfred E. Smith
*Assistant Examiner*—T. N. Grigsby

[57] ABSTRACT

Apparatus for loading a single sheet of X-ray film into a cassette, from a plastic lighttight envelope containing a stack of such sheets, all in a daylight environment. A receiver for holding the envelope containing the sheets includes a clip at the top that holds one end of the envelope and a groove at the bottom into which the lower end of the envelope can be laid. A rod lies in the groove over the envelope, so that when the lower envelope end is cut, no light leaks in. However, when the receiver is placed on a dispenser, the rod can be withdrawn from outside the envelope to open the envelope and allow the stack of film to fall out into the dispenser which can feed one sheet at a time into the cassette. The cassette lies in a pivotally mounted cassette-holding housing that has a light seal at the top so that, when the housing pivots under the dispenser, the apparatus is sealed against light and, when the housing pivots away from the dispenser, the cassette can pop up and be withdrawn through the top of the housing.

10 Claims, 7 Drawing Figures

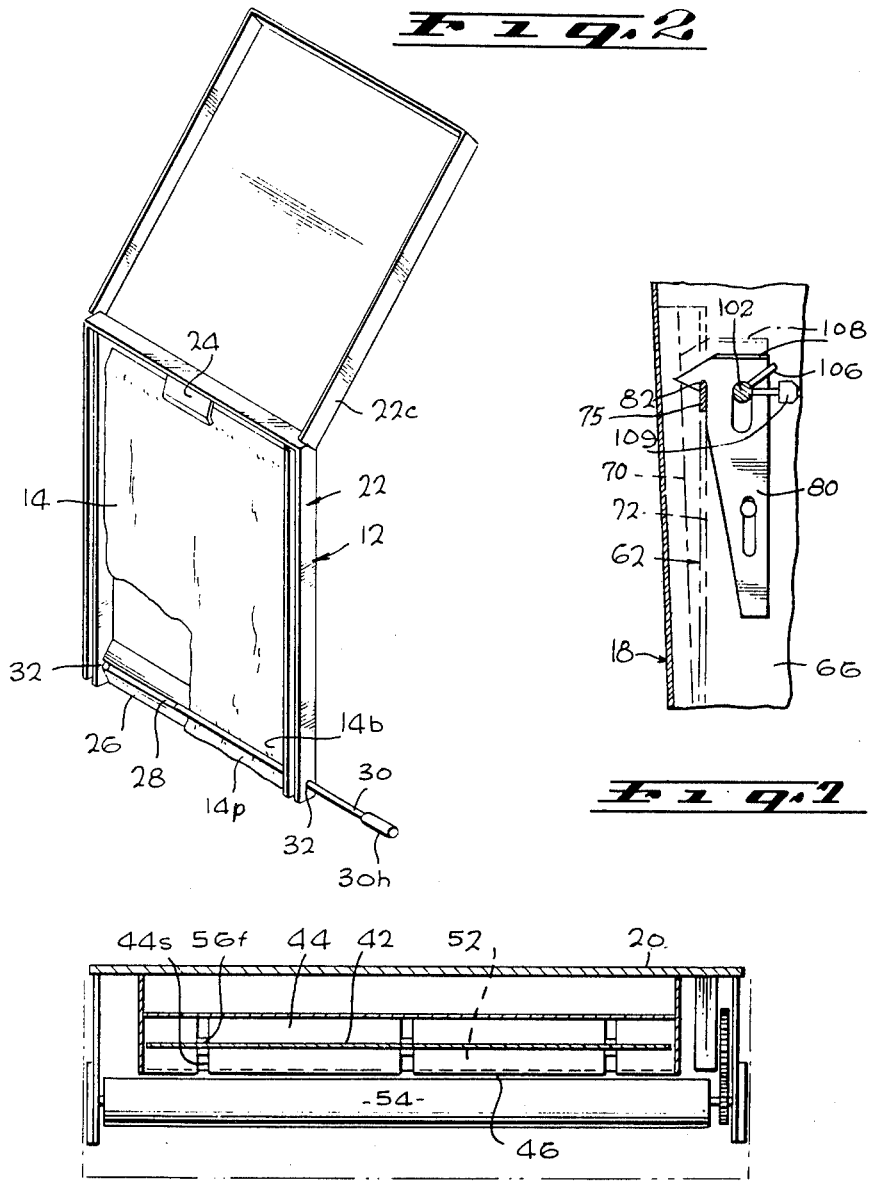

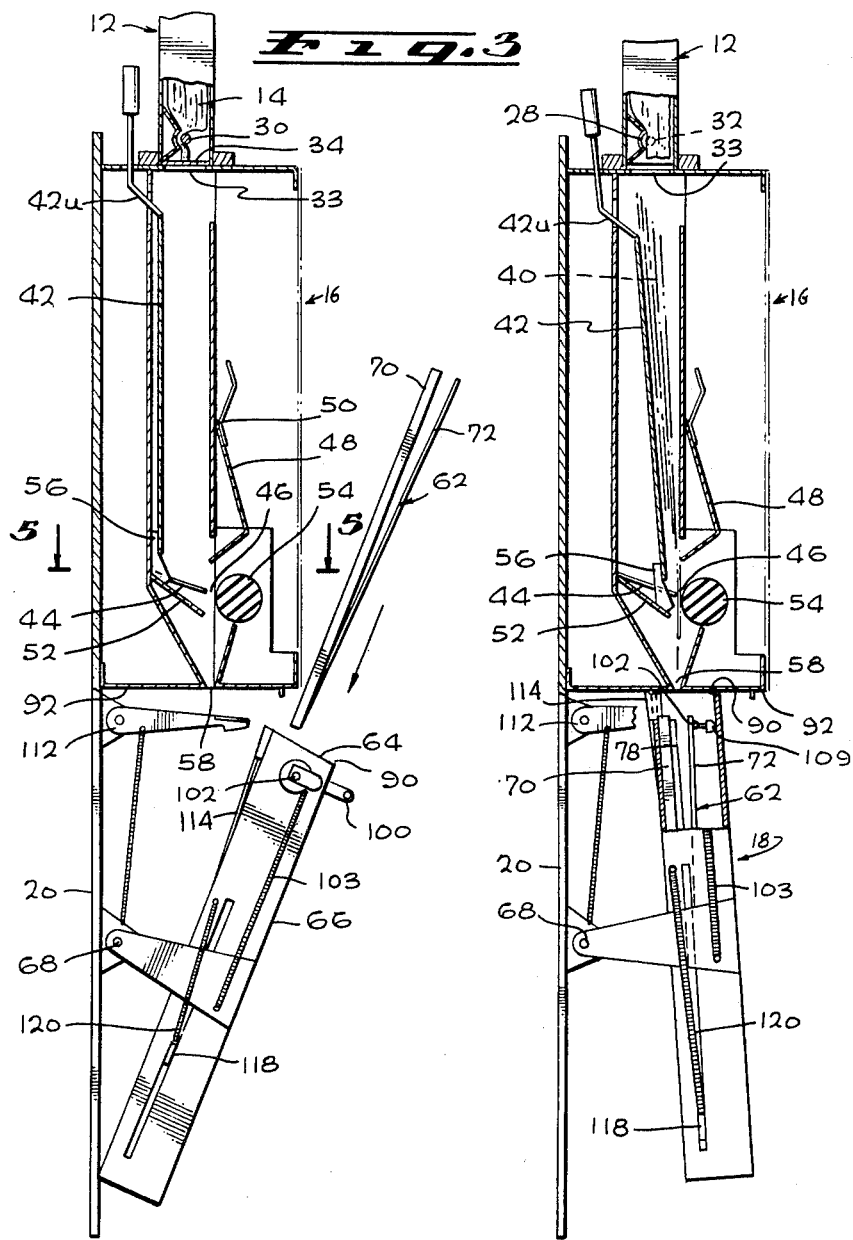

X-RAY FILM LOADER

CROSS REFERENCE

This is a continuation-in-part of my copending application Ser. No. 805,817, filed June 13, 1977 and now abandoned.

DESCRIPTION

TECHNICAL FIELD

This invention relates to a daylight loading apparatus for dispensing a sheet of X-ray film into a cassette.

BACKGROUND

One standard type of cassette utilized in chest X-ray photography employs a hinged housing which receives a sheet of X-ray film. The film is typically marketed in a package containing a stack of film sheets surrounded by a lighttight envelope formed of black plastic film. The cassette is typically loaded by opening the envelope and transferring one sheet into the cassette, all in a dark room. A mechanism which allowed the opening of the package and the dispensing of one sheet at a time into cassettes, all in a daylight environment, would facilitate the handling of X-ray film.

DISCLOSURE OF INVENTION

In accordance with one embodiment of the present invention, an X-ray film loader is provided which enables the opening of a lighttight envelope containing film sheets, and the transfer of a single sheet at a time into a cassette, all in a daylight environment. The apparatus includes a lighttight receiver housing having a clip at the top for holding the envelope and a groove near the bottom in which an end portion of the envelope lies. A rod lies in the groove over the envelope to seal it, so that an extreme end of the envelope lying beyond the groove can be cut open without admitting light. When the receiver housing is closed and mounted on a dispenser, the rod can be pulled out to allow the film to drop from the envelope into a dispenser housing. The dispenser housing includes a backing plate which can slide down an incline to push the stack of films so the forward film drops against a roller and can be moved down into an open cassette lying in a cassette-holding housing. The cassette-holding housing has an open top and can pivot between a first position aligned with the dispenser housing to receive a sheet into the cassette, or pivot away so the top of the cassette-holding housing is open for the removal of the cassette.

DESCRIPTION OF DRAWINGS

FIG. 2 is a perspective view of the receiver housing of FIG. 1, shown in an open condition and with a film-holding envelope therein.

FIG. 3 is a sectional side view of the apparatus of FIG. 1, shown with film still in the receiver housing and showing the cassette being inserted into the cassette-receiving housing.

FIG. 4 is a view similar to FIG. 3, but shown with the film sheets lying in the dispenser housing and with the cassette held in the cassette-holding housing ready to receive a film sheet.

FIG. 5 is a view taken on the line 5—5 of FIG. 3.

FIG. 7 is a view taken on the line 7—7 of FIG. 6.

DESCRIPTION OF APPARATUS

Figure 1:
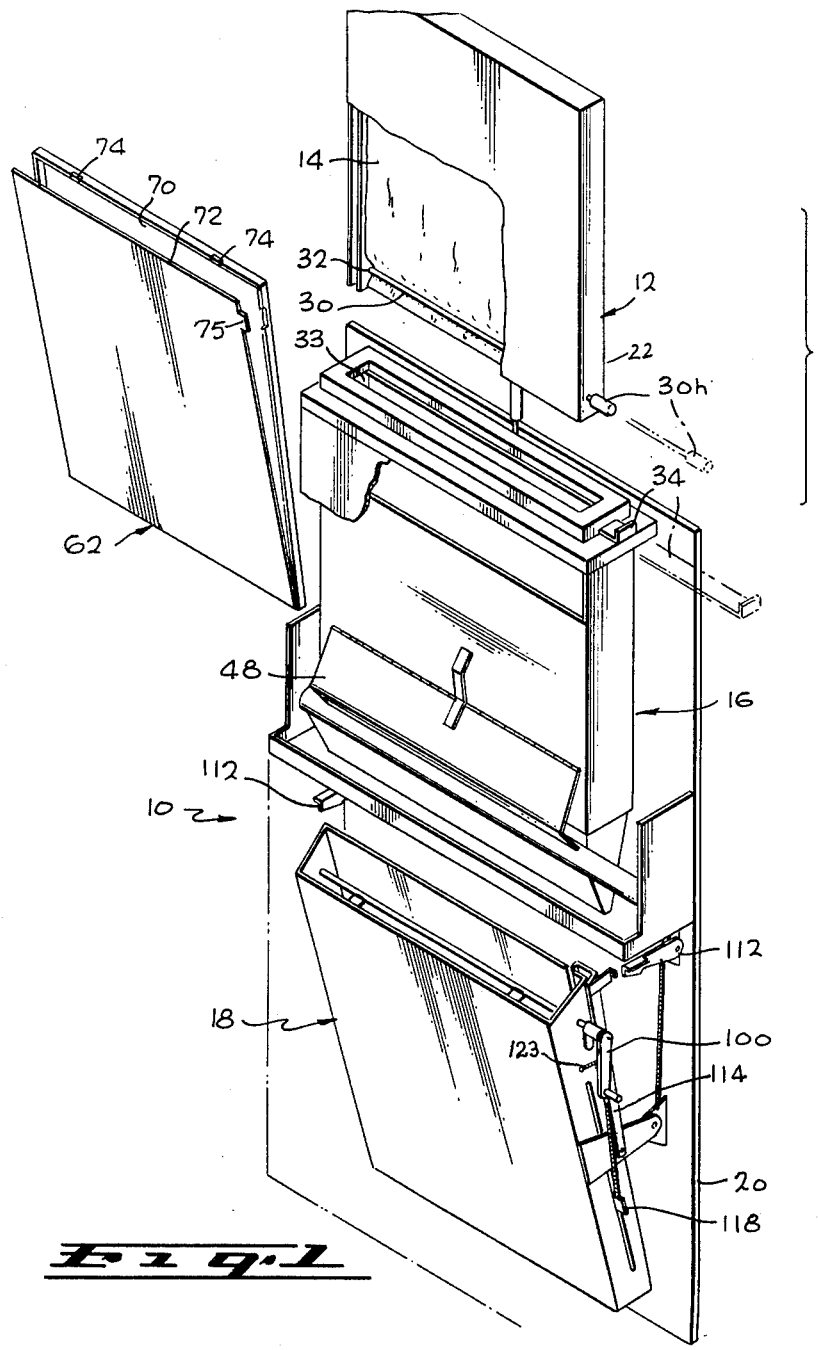
FIG. 1 is a perspective view of a film loader apparatus constructed in accordance with the present invention, with some of the protective housing cut away.

FIG. 1 illustrates a daylight loading apparatus 10 which includes a lighttight film package receiver 12, for receiving an envelope 14 containing numerous sheets of X-ray film, and a dispenser 16 which can receive a stack of film from the envelope and dispense one film at a time. Envelope 14 is made from black plastic film and is accordingly lighttight. The apparatus also includes a holder 18 which can hold a cassette to receive a film and then close the cassette. A frame 20, which supports the apparatus, can be mounted on a wall or other location.

FIG. 2 illustrates the film package receiver 12 in an open condition, wherein a cover 22c of the receiver housing 22 has been swung open. The receiver includes a clip 24 at the upper portion of the housing for clipping to the film-holding envelope 14. A wall 26 near the bottom of the housing forms a groove 28 which receives the lower portion 14p of the envelope. A rod 30 extending through holes 32 at the side of the housing, lies in the groove 28 over the envelope 14, to securely hold the lower end of the envelope in a lighttight seal to the grooved wall 26. The envelope 14 is normally loaded while oriented in a horizontal position so that the normally top and lower ends are at generally the same level. After the top of the envelope is clipped in place at 24, and the lower end is held in the groove 28 by the rod 30, the lower portion 14p of the envelope, which projects beyond the groove, can be cut by a scissors. No light will reach the film because the rod 30 forms a lighttight seal with the envelope. After the envelope has been cut, the cover 22c of the housing is closed and the film receiver 12 can be mounted on top of the loading apparatus 10 in the manner shown in FIG. 1, wherein the bottom of the housing 22 is received in a corresponding hole 33 of the film dispenser 16.

After the receiver 12 has been mounted on the dispenser 16, in a lighttight seal therewith, a light seal 34 on the dispenser is pulled out. Then a handle portion 30h is pulled out to remove rod 30 and release the film so that it can fall through the opening 33 into the dispenser 16. FIG. 3 illustrates the apparatus prior to pulling out the rod 30, while FIG. 4 illustrates the manner in which the stack of film sheets 40 falls down into the dispenser when the rod has been pulled out to release the film sheets. When the film sheets are in the dispenser, seal 34 can be reinserted and receiver 12 can then be removed. The dispenser 16 includes a backing plate 42, with blocks 56 of low friction material, such as an acetal plastic, at its lower end. When the film falls, it falls onto a downwardly inclined guide wall 44, at a position in front of the backing plate 42, so that the dispensing of individual sheets of film can begin, through a throat 46 formed between the forward edge of wall 44 and a roller 54. It may be noted that a guard 48 is provided that has a lower end lying over the throat 46 to prevent a jam of film sheets above the throat 46. The guard 48 is pivotally mounted at 50 and will easily deflect out of the way during normal dispensing of a film.

The blocks 56 at the bottom of the backing plate have fingers 56f (FIG. 5) extending through three slots 44s in the guide wall 44. The bottoms of the fingers 56f rest on an inclined wall 52 (FIG. 3), so that the plate tends to move forward when its upper end 42u is released.

Dispensing of film down through the throat 46 is initiated by manually releasing the backing plate 42 so it can slide forward towards the throat 46. This allows the film blocks 56 at the bottom of the plate to move the film forward so that the forwardmost sheet is pushed against the roller 54 and can begin moving down when the roller 54 is rotated by a motor (not shown). The roller then pushes the sheet down through another throat 58.

A cassette 62 can be inserted into the cassette holder 18, by first pivoting the cassette holder to the position shown in FIG. 3 so that the open top 64 of the holder is accessible to receive the cassette. The cassette holder has a housing 66 pivotally mounted at 68 on the frame 20 of the loading apparatus. It may be noted that the pivot axis 68 is located behind the film dispensing throat, so that as the cassette holder 18 pivots back it also moves up slightly. After the cassette has been loaded into the holder 18, the holder is pivoted to the position shown in FIG. 4, wherein its open top 64 is aligned with the lower throat 58 of the dispenser. With the cassette 62 open, the downward movement of a film sheet 40, through the throat 58, brings the sheet into the cassette. The cassette is then closed, the holder 18 is pivoted to the position shown in FIG. 3, and the film-holding cassette can be removed.

Figure 6:
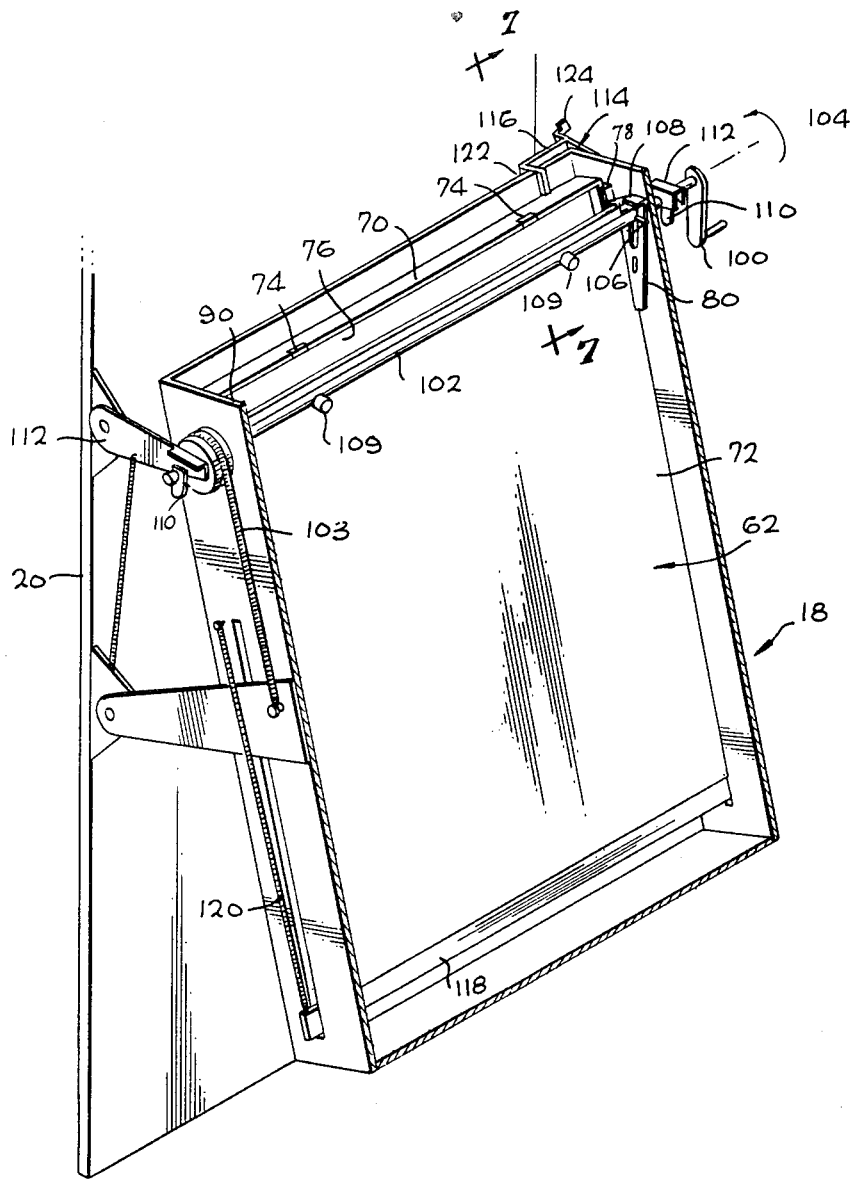
FIG. 6 is a perspective view of the cassette-holding housing of FIG. 1, shown with the cassette in an open position.

FIG. 6 illustrates details of the cassette holder 18. The cassette 62 includes two walls 70, 72 hinged at their lower ends, and having latches 74 at their upper ends which hold the cassette closed when the walls 70, 72 are moved together. The rearward wall 70 of the cassette forms an opening 76 into which the forward wall 72 of the cassette is received when closed. When the cassette is inserted into the holder 18, the rearward wall 70 slides between a pair of receiving walls 78 that present a slide for the rearward cassette wall 70 while allowing the forward cassette wall 72 to hinge forwardly and remain open. A hold-open cam 80 can lift to receive a tab 75 of the forward cassette wall, as shown in FIG. 7, wherein the tab 75 is received in a slot 82 of the cam 80. Thus, when the cassette is inserted into the holder and pivoted open, its two walls 70, 72 are maintained open to assure that a film sheet will be dropped into an open cassette.

After the cassette has been loaded into the holder 18, the holder is pivoted to the position shown in FIG. 4. An edge 90, forming the top of the holder housing, forms a lighttight seal against the lower wall 92 of the dispenser, around the lower throat 58 through which a film sheet emerges. Thus, a lighttight seal is formed merely by pivoting back the top of the cassette holder 18. After the film has been dispensed from the dispenser 16, as described above, the cassette 62 must be closed before the holder 18 is pivoted forward. This is accomplished by turning a handle 100 (FIG. 6) located outside the cassette-holder housing 66.

The handle 100 tends to extend downwardly from a rotatable rod 102, because of a spring 103 coupled to the rod. When the handle 100 is turned in the direction of arrow 104, a camming pin 106 on the rod 102 engages a flange 108 on the cam 80 to lift it. Lifting of the cam releases tab 75 so that the forward wall 72 of the cassette can be closed against the rearward wall 70. Further turning of the handle 100 in the direction of arrow 104 brings a pair of closing cams 109 against the cassette wall 72 to push it closed. Still further turning of the handle causes a pair of release cams 110, fixed to the handle, to lift a pair of catches 112 that release the cassette holder 18 so its upper end can pivot forward. When the holder pivots forward, the cassette can be removed through the open top 64 of the cassette holder. The cassette 62 is then ready for placement in a chest X-ray machine.

Prior to the holder 18 pivoting forward, the cassette 62 is held down by a hold-down member 114 (FIGS. 1 and 6) that is pivotally mounted at a side of the holder housing 66 and has an arm 116 that terminates in a lateral tab 122. Tab 122 normally extends through a slot in housing 66 where it can engage wall 70 of cassette 62 and is biased to that position by spring 123 (FIG. 1). At the same time, the cassette is urged upwardly by a cassette support 118 that is vertically slidable on the holder housing and that is upwardly biased by springs 120. As the holder 18 pivots forward, after the cassette therein has received a film and been closed, the hold-down member 114 is automatically pivoted out of the way of the cassette. This is accomplished by a hinged tab at the side of the dispenser bottom, which engages an arm 124 on the hold-down member 114 to pivot the hold-down member out of engagement with the cassette. The cassette then pops up under the force applied by spring 120, to facilitate removal of the cassette. When a technician installs another cassette in the holder, he can use the cassette to retract tab 122 and then pushes it down against the support 118, until tab 122 returns to its formal position over the cassette.

Thus, the invention provides an apparatus for receiving an envelope containing a stack of film sheets, and means for loading individual film sheets into cassettes, all in a daylight environment. This is accomplished by an apparatus for opening the envelope, which includes a rod that holds an end portion of the envelope in a groove so that the envelope can be cut open without admitting light. A simple dispenser is utilized which can receive a stack of film from the envelope and dispense one sheet at a time. A cassette holder is utilized which can pivot from a position under the dispenser and in a lighttight fit therewith, to a second position wherein the cassette can be removed from the top of the cassette holder.

I claim:
1. Apparatus for receiving a lighttight envelope containing a stack of film sheets and for loading one film sheet at a time into a cassette, comprising:
   a lighttight dispenser housing having upper and lower walls provided with openings;
   a lighttight receiver housing mounted on and having an exit at its lower end for discharging said stack of films to the dispenser housing;
   means at the upper end of said receiver housing for holding one end of the said envelope, and means at the lower end of said receiver housing for clamping the opposite end of the envelope, said clamping means being releasable from outside said receiver housing to allow the film stack to fall down through said lower end of the receiver housing to the dispenser housing;
   means in said dispenser housing for passing only one film sheet at a time, to fall through said lower end of said dispenser housing; and
   a lighttight cassette-holding housing disposed under said dispenser housing for holding a cassette in an open position under the lower end of said dispenser housing portion, and including cassette closing means for closing the cassette while it lies in said cassette-holding housing.

2. Apparatus for receiving an envelope containing a stack of film sheets under daylight conditions, and for then releasing the film sheets out of the envelope, comprising:
- a lighttight housing which can be opened for receiving said envelope;
- clip means in said housing for holding one end of said envelope; and
- releasable clamp means for clamping the other of said envelope which lies opposite said clip means, across the width of said envelope, to prevent the entrance of light into said other end of the envelope end when it is cut along a portion lying beyond said clamp means, said clamp means being releasable while the housing is closed to allow the film sheets to fall out of the envelope.

3. The apparatus described in claim 2 wherein:
- said clamp means includes a wall forming a groove, and a rod which lies in said groove, said rod having a handle portion outside said housing to enable said rod to be pulled out.

4. Apparatus for use in loading a sheet of film into a cassette of the type which has a hinged end and an opposite openable end, comprising:
- a frame;
- lighttight dispenser means mounted on said frame for dispensing a sheet of film; and
- a cassette-holder mounted on said frame under said dispenser means, including a housing with an upper end having an opening for receiving a sheet of film from said dispenser means, means for holding an open cassette with its openable end facing said housing upper end to receive a film sheet therethrough, and means for closing the cassette while it lies in said housing;
- said housing being pivotally mounted on said frame for movement between a first position wherein said opening in the upper end of said housing is in line with said dispenser means to receive a film sheet therefrom, and a second position wherein said opening is out of the way of said dispenser means to permit the insertion and removal of a cassette therefrom, the upper end of said housing having a seal means around said opening for forming a lighttight seal against said dispenser means when in said first position, said holding means including a cam member movably mounted on said housing and engagable with the cassette at its open end, a shaft rotatably mounted on said housing, and a pin on the shaft for moving the cam member out of engagement with the cassette.

5. The apparatus described in claim 4 wherein:
- said means for closing the cassette includes a closing cam on the shaft for pushing said cassette to close it when the cam member has been moved out of engagement with the cassette, a handle outside said housing for turning the shaft, catch means for holding said cassette-holding housing in said first position, and a release cam coupled to said shaft to move with it and release said housing from said catch when said shaft turns far enough to close the cassette in said housing, so that the housing can then pivot to said second position for removal of the cassette.

6. The apparatus described in claim 5 wherein:
- said cassette has a pair of walls pivotally joined at said hinged end;
- said means for closing the cassette includes receiving walls which hold a first of said cassette walls and a hold-open cam which can hold a second of said cassette walls, to thereby prevent unintentional closing of the cassette prior to it receiving a film; and
- said rod carries a member which moves said hold-open cam out of holding engagement with said second cassette wall prior to pushing of said closing cam against said cassette.

7. The apparatus described in claim 4 wherein:
- the axis of pivoting of said cassette-holding housing lies rearwardly of the path of film moving out of said dispenser, whereby the upper end of said frame moves upwardly as it pivots toward said first position.

8. A method for opening an envelope containing a stack of film sheets and loading the sheets into a dispenser, without exposing the sheets to daylight in the environment, comprising:
- securing a first end of the envelope of a first end of an opened but closeable housing which has an open second end;
- laying the second end of the envelope in a groove at the second end of the housing, but with the extreme second end of the envelope extending beyond the groove;
- pressing a member against the second envelope end to hold it tightly in the groove, and then closing the housing;
- opening the second end of the envelope at a location which lies beyond said groove;
- holding the second end of the housing over an opening in a dispenser; and
- withdrawing the member from the groove, to allow the stack of film to fall through the open end of the envelope and the open second end of the housing into the dispenser.

9. Apparatus for use in holding a cassette with pivotally joined first and second walls, adjacent to a film dispenser, comprising:
- a lightight cassette-holding housing having an open end which can receive a cassette and which can be placed adjacent to a film dispenser to receive a film sheet;
- first and second members for holding first and second walls of the cassette apart; and
- a shaft rotatably mounted on said housing, a first cam coupled to said shaft and moveable thereby to release said first member to allow said first wall to move toward said second wall, and a second cam coupled to said shaft and moveable thereby against said cassette to close it after said first cam has released said first member.

10. The apparatus described in claim 9 including:
- a frame pivotally supporting said cassette-holding housing to move in line and away from the film dispenser;
- a cassette support for receiving a cassette, said support being slideable in said housing to urge an end of said cassette to project from the housing open end for easy removal;
- a spring urging said cassette support toward said open end; and
- means responsive to said cassette housing pivoting out of line with the film dispenser, for releasing said second member which holds said second cassette wall, to allow an end of the cassette to pop out of the housing.

* * * * *

UNITED STATES PATENT AND TRADEMARK OFFICE
CERTIFICATE OF CORRECTION

PATENT NO. : 4,201,919
DATED : May 6, 1980
INVENTOR(S) : Gunter Schmidt

It is certified that error appears in the above—identified patent and that said Letters Patent is hereby corrected as shown below:

Column 5, line 13, delete "end"

Column 6, line 19, "of"(second occurrence)should read -- to --.

Signed and Sealed this

Second Day of September 1980

[SEAL]

Attest:

SIDNEY A. DIAMOND

Attesting Officer  Commissioner of Patents and Trademarks